United States Patent [19]

Taubitz et al.

[11] Patent Number: 4,965,318
[45] Date of Patent: Oct. 23, 1990

[54] THERMOPLASTIC MOLDING MATERIALS BASED ON NYLONS AND STYRENE COPOLYMERS

[75] Inventors: Christof Taubitz, Wachenheim; Erhard Seiler, Ludwigshafen; Juergen Hambrecht, Münster-Hiltrup; Konrad Mitulla, Ludwigshafen; Horst Reimann, Worms, all of Fed. Rep. of Germany

[73] Assignee: BASF Aktiengesellschaft, Ludwigshafen, Fed. Rep. of Germany

[21] Appl. No.: 218,977

[22] Filed: Jul. 14, 1988

Related U.S. Application Data

[62] Division of Ser. No. 10,437, Feb. 3, 1987, abandoned.

[30] Foreign Application Priority Data

Feb. 12, 1986 [DE] Fed. Rep. of Germany ....... 3604349

[51] Int. Cl.$^5$ ............................................. C08L 77/00
[52] U.S. Cl. ..................................... 525/179; 525/182; 525/183
[58] Field of Search .................. 525/182, 179, 183

[56] References Cited

U.S. PATENT DOCUMENTS

| | | | |
|---|---|---|---|
| 3,334,153 | 8/1967 | Fukushima et al. | 525/179 |
| 4,590,242 | 5/1986 | Horn et al. | 525/183 |
| 4,598,125 | 7/1986 | Horn et al. | 525/183 |
| 4,612,346 | 9/1986 | Chiba et al. | 525/182 |

Primary Examiner—Ana L. Carrillo
Attorney, Agent, or Firm—Oblon, Spivak, McClelland, Maier & Neustadt

[57] ABSTRACT

Thermoplastic molding materials contain
(A) from 5 to 95% by weight of a nylon and
(B) from 5 to 95% by weight of a copolymer composed of ($B_1$) from 50 to 99.9% by weight of a styrene of the general formula I

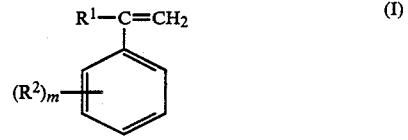

where $R^1$ is alkyl or 1 to 4 carbon atoms or hydrogen, $R^2$ is alkyl of 1 to 6 carbon atoms or halogen and m is 0, 1, 2 or 3, ($B_2$) from 0.1 to 30% by weight of a monomer containing epoxide groups (II)

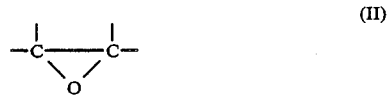

or of a monomer containing lactam groups (III)

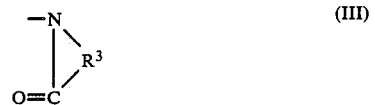

or of a monomer containing halobenzyl groups (IV)

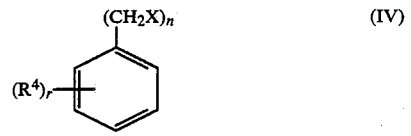

where $R^3$ is a divalent, branched or straight-chain alkyl group of 2 to 15 carbon atoms, $R^4$ is alkyl of not more than 6 carbon atoms, X is halogen, n is 1, 2 or 3 and r is 0, 1, 2 or 3, and ($B_3$) from 0 to 48% by weight of further comonomers.

4 Claims, No Drawings

THERMOPLASTIC MOLDING MATERIALS BASED ON NYLONS AND STYRENE COPOLYMERS

This application is a division of U.S. application Ser. No. 07/010,437, filed Feb. 3, 1987, and now abandoned.

The present invention relates to novel thermoplastic molding materials containing (A) from 5 to 95% by weight of a nylon and (B) from 5 to 95% by weight of a copolymer composed of ($B_1$) from 50 to 99.9% by weight of a styrene of the general formula I

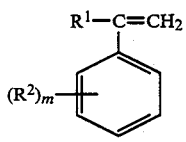

where $R^1$ is alkyl of 1 to 4 carbon atoms or hydrogen, $R^2$ is alkyl of 1 to 6 carbon atoms or halogen and m is 0, 1, 2 or 3, ($B_2$) from 0.1 to 30% by weight of a monomer containing epoxide groups (II)

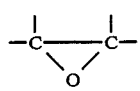

or of a monomer containing lactam groups (III)

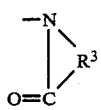

or of a monomer containing halobenzyl groups (IV)

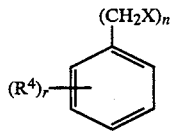

where $R^3$ is a divalent, branched or straight-chain alkylene group of 2 to 15 carbon atoms, $R^4$ is alkyl of not more than 6 carbon atoms, X is halogen, n is 1, 2 or 3 and r is 0, 1, 2 or 3, and ($B_3$) from 0 to 48% by weight of further comonomers.

The present invention furthermore relates to the use of such molding materials for the production of moldings, and to moldings produced from the molding materials.

U.S. Pat. No. 3,134,746 describes blends of polycaprolactam and acrylonitrile/butadiene/styrene copolymers (ABS).

Because of the incompatibility of the two polymers forming the blend, the moldings produced from these blends have poor mechanical properties; the moldings separate into layers (delamination).

According to U.S. Pat. No. 3,485,777, peroxides are used in order to increase the compatibility of nylons and styrene polymers. However, the products produced in this manner have poorly reproducible properties, i.e. constant product quality is not ensured.

DE-A 30 37 520 describes block copolymers containing blocks of styrene copolymers and nylons. These materials have a very high melt flow index, which is a disadvantage for processing.

EP-A 80 720 attempts to avoid this problem by using styrene polymers containing carboxamide groups. However, products produced from these materials have a pronounced tendency to yellow.

It is an object of the present invention to provide molding materials consisting of nylons and styrene polymers, the said materials possessing good mechanical properties and being capable of being processed to high quality moldings.

We have found that this object is achieved, according to the invention, by thermoplastic molding materials containing (A) from 5 to 95% by weight of a nylon and (B) from 5 to 95% by weight of a copolymer composed of ($B_1$) from 50 to 99.9% by weight of a styrene of the general formula I

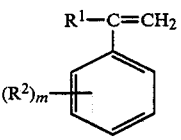

where $R^1$ is alkyl of 1 to 4 carbon atoms or hydrogen, $R^2$ is alkyl of 1 to 6 carbon atoms or halogen and m is 0, 1, 2 or 3, ($B_2$) from 0.1 to 30% by weight of a monomer containing epoxide groups (II)

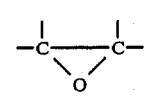

or of a monomer containing lactam groups (III)

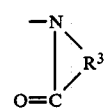

or of a monomer containing halobenzyl groups (IV)

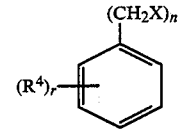

where $R^3$ is a divalent, branched or straight-chain alkyl group of 2 to 15 carbon atoms, $R^4$ is alkyl of not more than carbon atoms, X is halogen, n is 1, 2 or 3 and r is 0, 1, 2 or 3, and ($B_3$) from 0 to 48% by weight of further comonomers.

Preferred molding materials of this type are described in the subclaims.

The novel thermoplastic molding materials are distinguished by good mechanical properties, in particular high impact strength (including multiaxial impact strength) and good resistance to solvents. The resistance to chemicals, heat and abrasion is substantially better than that of styrene polymers, and the molding materials according to the invention exhibit substantially less shrinkage than nylons. The good processability and flow are also particularly advantageous.

The novel molding materials contain, as component A, a nylon in an amount of from 5 to 95, preferably from 10 to 90, particularly preferably from 35 to 80, % by weight.

There are no particular restrictions with regard to the structure and molecular weight of the nylons, but nylons having a molecular weight of from 8,000 to 60,000 are generally preferred.

Examples of preferred nylons are those which are derived from lactams having from 7 to 13 ring members, such as polycaprolactam, polycapryllactam or polylauryllactam, and nylons which are obtained by reacting a dicarboxylic acid with a diamine. Alkanedicarboxylic acids of 6 to 12, in particular 6 to 10, carbon atoms, terephthalic acid and isophthalic acid are among the preferred dicarboxylic acids, while alkanediamines of 6 to 12, in particular 6 to 8, carbon atoms, p-xylylenediamine, di-(4-aminophenyl)-methane, di-(4-aminocyclohexyl)-methane and 2,2-di-(4-aminophenyl)-propane are among the preferred diamines. Both the dicarboxylic acids and the diamines can be used individually or in any combination. It is also possible, and frequently advantageous, to use blends of a plurality of the stated nylons for the thermoplastic molding materials.

Polycaprolactam, polyhexamethylene adipamide and nylons composed of hexamethylenediamine and isophthalic acid and/or terephthalic acid have become particularly important industrially.

The nylons which can be used according to the invention are known per se or can be prepared from the monomers by a conventional process, so that further information is superfluous here.

The novel molding materials contain, as component B, copolymers composed of styrene and/or substituted styrenes $B_1$ and monomers $B_2$ containing epoxide groups (II) or lactam groups (III) or halobenzyl groups (IV), and, if required, further copolymerizable monomers $B_3$.

The amount of styrene $B_1$ in component B is from 50 to 99.9, preferably from 70 to 95, % by weight. The styrenes are of the general formula I

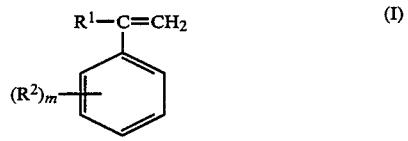

where $R^1$ is alkyl of 1 to 4 carbon atoms, preferably methyl, or hydrogen, $R^2$ is halogen, preferably chlorine, or alkyl of 1 to 6 carbon atoms, preferably methyl or ethyl, and m is 0, 1, 2 or 3. Examples of these are α-methylstyrene, o-, m- and p-methylstyrene, m-ethylstyrene, dimethylstyrene, chlorostyrene and mixtures of these compounds.

Of course, it is also possible to use mixtures of various substituted styrenes or mixtures of styrene and substituted styrenes, which frequently even has advantages.

The copolymers B contain component $B_2$ as components which are essential to the invention. The compatibility-improving action of this component is probably attributable to an interaction of the functional group of component $B_2$ with the components $B_1$ and A. Whether this is a physical interaction or involves the formation of covalent bonds cannot be stated with certainty.

Component $B_2$ is a monomer possessing epoxide(II) or lactam(III) or halobenzyl groups (IV).

Among the monomers which contain epoxide groups (II)

those possessing a plurality of epoxide groups are preferred. In principle, all epoxide-containing monomers are suitable if it is ensured that the epoxide group is present in the free form after the reaction.

It may be stated here that the free epoxide groups may also be introduced into polymer B by epoxidation of polymers of the monomers $B_1$ with epoxidizing agents.

The amount of the epoxide-containing monomer is from 0.1 to 30, preferably from 0.5 to 20, particularly preferably from 1 to 10, % by weight, based on component B.

Glycidyl-containing monomers, e.g. vinyl glycidyl ether or allyl glycidyl ether, and (meth)acrylates containing glycidyl groups, in particular glycidyl acrylate and glycidyl methacrylate, may be mentioned here merely by way of typical examples of epoxide-containing monomers $B_2$.

Typical examples of preferred components B containing epoxide groups are copolymers of ($B_1$) from 90 to 99% by weight of styrene, α-methylstyrene and/or p-methylstyrene and ($B_2$) from 1 to 10% by weight of glycidyl (meth)acrylate or ($B_1$) from 50 to 91% by weight of styrene, α-methylstyrene and/or p-methylstyrene, ($B_2$) from 1 to 10% by weight of glycidyl (meth)acrylate and ($B_3$) from 8 to 40% by weight of acrylonitrile and/or methacrylonitrile.

Monomers containing lactam groups (III) are useful as the second group of monomers $B_2$.

These monomers contain a lactam group of the general formula III

where $R^3$ is a branched or straight-chain alkylene group of 2 to 15 carbon atoms.

Among these monomers, preferred compounds are those which can be polymerized or copolymerized to nylons according to Houben-Weyl, Methoden der organischen Chemie, Vol. X/2, pages 511–87 (1975) and Vol. XIV/2, pages 111–131.

β-Propiolactams (azetidin-2-ones) of the general formula (V)

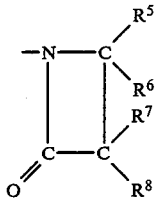 (V)

where $R^5$ to $R^8$ are each alkyl of 1 to 6 carbon atoms or hydrogen, may be mentioned here merely as typical examples. These compounds are described by R. Graf in Angew. Chem. 74 (1962), 523–530 and by H. Bastian in Angew. Chem. 80 (1968), 304–312. Examples of these are 3,3'-dimethyl-3-propiolactam, 2-pyrrolidones

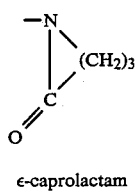

ε-caprolactam

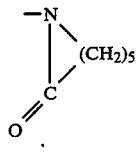

7-enantholactam, 8-capryllactam and 12-laurolactam, as also described by H. Dachs, Angew. Chem. 74 (1962), 540–45.

Among these compounds, 2-pyrrolidones and ε-caprolactams are particularly preferred.

The lactam groups III are preferably incorporated into the monomer $B_2$ via a carbonyl group on the nitrogen, as in moiety (VI)

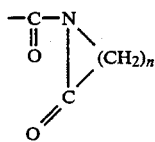 (VI)

A particularly preferred example of this is N-(meth)acryloyl-ε-caprolactam (VII)

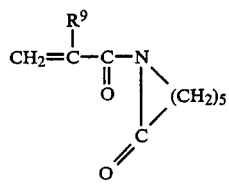 (VII)

where $R^9$ is hydrogen or methyl.

The amount of monomers $B_2$ possessing lactam groups in components B is from 0.1 to 30, preferably from 0.1 to 5, % by weight, based on component B.

This gives, for example, the following compositions for component B:

($B_1$) from 95 to 99.9% by weight of styrene, α-methylstyrene and/or p-methylstyrene and ($B_2$) from 0.1 to 5% by weight of N-(meth)acryloyl-ε-caprolactam or, where monomers $B_3$ are present, ($B_1$) from 55 to 91% by weight of styrene, α-methylstyrene and/or p-methylstyrene, ($B_2$) from 0.1 to 5% by weight of N-(meth)acryloyl-ε-caprolactam and ($B_3$) from 8 to 40% by weight of (meth)acrylonitrile.

Monomers which contain halobenzyl groups (IV)

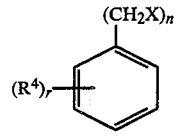 (IV)

where $R^4$ is alkyl of 1 to 6 carbon atoms, X is halogen, preferably Cl or Br, n is 1, 2 or 3 and r is 0, 1, 2 or 3, may be mentioned as the third group of suitable monomers $B_2$.

The halobenzyl groups can be introduced into the copolymer B by conversion of a methyl-containing styrene polymer which reacts with halogenating agents or by chloromethylation of an aromatic polymer, but the preparation by copolymerization of styrene and/or substituted styrenes and halobenzyl-carrying monomers is preferred. Regarding the adhesion-improving action, however, no significant differences are observed between the polymers B prepared by different methods.

Among the monomers containing halobenzyl groups (IV), only m- and p-chloromethylvinylbenzene are mentioned here as typical examples, owing to the fact that they are readily available. The amount of these compounds in component B is from 0.1 to 30, preferably from 0.1 to 20, in particular from 0.5 to 7.5, % by weight, so that the following compositions are examples of preferred halobenzyl-containing components B:

($B_1$) from 92.5 to 99.5% by weight of styrene, α-methylstyrene and/or p-methylstyrene ($B_2$) from 0.5 to 7.5% by weight of p- and/or m-chloromethylvinylbenzene and, where further monomers $B_3$ are present, ($B_1$) from 50 to 91% by weight of styrene, α-methylstyrene and/or p-methylstyrene, ($B_2$) from 0.5 to 7.5% by weight of p- and/or m-chloromethylvinylbenzene and ($B_3$) from 8 to 40% by weight of (meth)acrylonitrile.

As stated for some abovementioned particularly preferred components B, up to 48% by weight of other comonomers may also be present in addition to components $B_1$ and $B_2$. (Meth)acrylonitrile and alkyl (meth)acrylates where alkyl is of 1 to 12 carbon atoms may be mentioned here merely by way of example, specific examples being methyl acrylate, ethyl acrylate, isopropyl and n-propyl acrylate, primary, secondary and tertiary butyl acrylate, 2-ethylhexyl acrylate and dodecyl acrylate.

Component B can be prepared by a conventional polymerization method, such as mass polymerization, suspension polymerization, emulsion polymerization or solution polymerization, either continuously or batchwise. Such methods are known per se and are described in the literature, so that no further information is necessary here.

The amount of component B in the novel molding materials is from 5 to 95, preferably from 10 to 90 and particularly preferably from 20 to 65, % by weight, based on the total weight of components A and B.

The polymers B employed preferably have a molecular weight of from 5,000 to 1,000,000, in particular from 80,000 to 500,000.

Component B may also be toughened. Such polymers are familiar to the skilled worker in the form of high impact polystyrene (HIPS) or ABS. To do this, the vinyl-aromatic polymers are prepared in the presence of an additive which improves the impact strength (impact modifier), or the vinylaromatic polymers are mixed with grafted rubbers. Examples of rubber-like polymers are polybutadiene, styrene/butadiene, styrene-b-butadiene, acrylonitrile/butadiene, ethylene/propylene, polyacrylate and polyisoprene rubbers.

The rubbers may be prepared in a conventional manner, and the sequence of addition of the individual monomers can be modified in a conventional manner. For example, in the preparation by emulsion polymerization, it is possible first to polymerize the butadiene, with or without the addition of styrene, acrylonitrile or a (meth)acrylate and with or without the addition of a small amount of a crosslinking agent, and then to graft other monomers or mixtures, such as (meth)acrylates, acrylonitrile, styrene or other polymerizable monomers, onto the grafting base thus obtained.

The amount of these rubbers can be up to 50, preferably up to 30, % by weight, based on component B.

In addition to the grafted rubbers, such as polybutadiene rubber, acrylate rubber, styrene/butadiene rubber, polybutene rubber, hydrogenated styrene/butadiene rubber, acrylonitrile/butadiene rubber, ethylene/propylene rubber and polyisoprene rubber which may be present in component B, these rubbers may also be added in ungrafted form to improve the impact strength. Further examples of rubbers for this purpose are styrene-grafted ethylene/propylene rubbers, thermoplastic ethylene/propylene rubbers, thermoplastic polyester elastomers, ethylene rubbers and ionomers, styrene/butadiene block copolymers, including AB, ABA, ABA tapering, star-shaped and block polymers, corresponding isoprene block copolymers and partially or completely hydrogenated block copolymers.

The amount of these rubbers may be up to 50% by weight, based on the total weight of components (A)+(B).

In addition to the components A and B, which must be present, the novel thermoplastic molding materials may contain conventional additives and processing assistants in an amount of up to 40, preferably up to 20, % by weight. Examples of such conventional additives are heat stabilizers, light stabilizers, lubricants, mold release agents and colorants, e.g. dyes and pigments. Other additives are reinforcing agents, such as glass fibers, asbestos fibers, carbon fibers, aromatic nylon fibers and/or fillers, gypsum fibers, synthetic calcium silicates, kaolin, calcined kaolin and phosphorus or phosphorus-containing compounds.

Low molecular weight or high molecular weight polymers, such as polystyrene, HIPS, styrene/acrylonitrile copolymers, acrylonitrile/butadiene/styrene copolymers, polyesters, polycarbonates, nitrile rubber or diene oils or waxes may also be used as additives.

Processes for the preparation of the thermoplastic molding materials are known per se. Advantageously, the individual components are mixed at from 250° to 320° C. in a conventional mixing apparatus, e.g. a kneader, Banbury mixer or single-screw extruder, but preferably in a twinscrew extruder. In order to obtain a very homogeneous molding material, thorough mixing is necessary. Under certain conditions, the components forming the molding material may react with one another. The order in which the components are mixed may be varied, i.e. all of the components may be mixed together or two or three components may be mixed beforehand and the other components then added.

As stated above, the novel molding materials are distinguished by extremely high impact strength. Compared with nylons, they exhibit greatly reduced shrinkage and substantially lower water absorption and are therefore particularly useful for the production of moldings possessing high dimensional stability. Processing may be effected by blow molding or extrusion for the production of pipes, panels, bottles and coatings.

In the description of components forming the novel molding materials, the following abbreviations are used:

VN: Viscosity number, determined at 25° C. on a 0.5% strength solution in dimethylformamide using an Ubbelohde viscometer according to DIN 53 726/8

MFI: Melt flow index, determined according to DIN 53 735 at 190° C. and under a load of 2.16 kg Mn: Number average molecular weight (cf. B. Vollmert, Grundriss der makromolekularen Chemie Vol. III, page 122 et seq.; E. Vollmert-Verlag Karlsruhe 1979).

EXAMPLES 1 TO 8

The following components were employed for the production of molding materials.

Component A

A/1 Polycaprolactam having an $M_n$ of 33,000
A/2 Polycaprolactam having an $M_n$ of 18,900

Component B

B/1 Copolymer of
  $B_1/1$ 97% by weight of p-methylstyrene and
  $B_2/1$ 3% by weight of chloromethylvinylbenzene (mixture of meta- and para-isomers in a weight ratio of 3:2),
prepared by continuous thermal polymerization for four hours with the addition of ethylbenzene (25% by weight, based on $B_1/1+B_2/1$) at 140° C. and under 700 kPa. The resulting random copolymer had a weight average molecular weight of 95,000.

B/2 Copolymer of
  $B_1/2$ 98% by weight of styrene and
  $B_2/1$ 2% by weight of chloromethylvinylbenzene (as for B/1),
prepared as for B/1; weight average molecular weight 140,000.

B/3 Copolymer of
  $B_1/2$ 62.5% by weight of styrene,
  $B_2/1$ 2.5% by weight of chloromethylvinylbenzene (as for B/1) and
  $B_3/1$ 35% by weight of acrylonitrile, prepared as for B/1; weight average molecular weight=125,000.

For comparison, components B*/1, B*/2 and B*/3, which correspond to components B/1, B/2 and B/3 and from which only the component $B_2/1$ was absent, were prepared.

The following rubbers were employed to effect modification:

K/1 Styrene/butadiene/styrene block copolymer containing 30% by weight of styrene (Cariflex ™ TR 1102)

K/2 Polybutadiene rubber having a core consisting of 60% by weight of polybutadiene and a shell consisting of styrene/methyl methacrylate (weight ratio 1:1), prepared by emulsion polymerization (Paraloid TM KM 653).

To produce the molding materials, the components were mixed in a twin-screw extruder at 280° C.

The impact strength was determined according to DIN 53 453 and the Izod notched impact strength according to ISO 180.

The composition of the molding materials and the results obtained are shown in Table 1.

TABLE 1

| Example | Composition (% by weight) A | B | K | Impact strength DIN 53 453 kJ/m² | Izod notched impact strength ISO 180/4 A kJ/m² |
|---|---|---|---|---|---|
| 1 | 60 A/1 | 40 B/1 | — | 25.2 | 4.5 |
| 1/V[1] | 60 A/1 | 40 B*/1 | — | 12.1 | 0.6 |
| 2 | 50 A/1 | 50 B/2 | — | 27.3 | 3.2 |
| 2/V[1] | 60 A/1 | 50 B*/2 | — | 10.7 | 0.7 |
| 3 | 40 A/1 | 60 B/3 | — | 33.2 | 4.5 |
| 3/V[1] | 40 A/1 | 60 B*/3 | — | 12.0 | 0.8 |
| 4 | 53 A/1 | 36 B/2 | 11 K/1 | 40.5 | 6.8 |
| 4/V[1] | 53 A/1 | 36 B*/2 | 11 K/1 | 15.6 | 1.0 |
| 5 | 51 A/1 | 42 B/3 | 7 K/2 | 58.2 | 14.1 |
| 6 | 68 A/1 | 32 B/3 | 9 K/2 | 63.5 | 13.2 |
| 7 | 58 A/2 | 31 B/1 | 11 K/1 | 45.1 | 10.1 |
| 8 | 48 A/1 | 48 B/3 | 4 K/2 | 30.1 | 7.2 |

[1]Comparative Examples

EXAMPLES 9 TO 19

In these examples, components B containing epoxide groups were employed. Molding materials were prepared from the following components:

Component A

A/1 Polycaprolactam having an $M_n$ of 33,000
A/2 Polycaprolactam having an $M_n$ of 18,900

Component B

B/4 Copolymer of
 $B_1/2$ 95% by weight of styrene and
 $B_2/2$ 5% by weight of glycidyl methacrylate,
prepared by continuous thermal copolymerization with the addition of 15% by weight, based on $B_1/2+B_2/2$, of ethylbenzene at 145° C. under 800 kPa. A random copolymer having a weight average molecular weight of 110,000 was obtained.

B/5 Copolymer of
 $B_1/2$ 92% by weight of styrene,
 $B_2/2$ 4% by weight of glycidyl methacrylate and
 $B_3/2$ 4% by weight of methyl methacrylate,
prepared as for B/4; weight average molecular weight=130,000.

B/6 Copolymer of
 $B_1/2$ 60% by weight of styrene,
 $B_2/2$ 8% by weight of glycidyl methacrylate and
 $B_3/1$ 32% by weight of acrylonitrile,
prepared as for B/4; weight average molecular weight=125,000.

B/7 Copolymer of
 $B_1/1$ 68% by weight of p-methylstyrene,
 $B_2/2$ 7% by weight of glycidyl methacrylate and
 $B_3/1$ 25% by weight of acrylonitrile, prepared as for B/4; weight average molecular weight=150,000.

B/8 Copolymer of
 $B_1/2$ 92% by weight of styrene and
 $B_2/2$ 8% by weight of glycidyl methacrylate,
prepared by polymerization in the presence of 8% by weight, based on $B_1/2+B_2/2$, of a polybutadiene latex prepared by anionic polymerization (Buna CB NX 529 C(TM) from Bayer), weight average molecular weight=250,000.

B/9 Copolymer of
 $B_1/2$ 70% by weight of styrene,
 $B_2/2$ 5% by weight of glycidyl methacrylate and
 $B_3/1$ 25% by weight of acrylonitrile,
prepared as for B/8 in the presence of 12% by weight, based on $B_1/2+B_2/2$, of the polybutadiene latex.

For comparison, the following polymers were prepared without the component B₂ essential for the invention.

B*/4 Polystyrene prepared as for B/4
B*/5 Copolymer of
 $B_1/2$ 96% of styrene and
 $B_3/2$ 4% of methyl methacrylate,
prepared as for B/4.

B*/6 Copolymer of
 $B_1/2$ 66% by weight of styrene and
 $B_3/1$ 34% by weight of acrylonitrile.

B*/8 Polystyrene, prepared as for B/8.

To effect modification, the rubber K/1 described in Examples 1 to 8 was employed.

The components were mixed in a twin-screw extruder at 280° C.

The compositions and the results of the impact strength and notched impact strength measurements are shown in Table 2.

TABLE 2

| Example | Composition (% by weight) A | B | K | Impact strength DIN 53 453 kJ/m² | Izod notched impact strength ISO 180/4 A kJ/m² |
|---|---|---|---|---|---|
| 9 | 50 A/1 | 50 B/4 | — | 20.4 | 2.7 |
| 9/V[1] | 50 A/1 | 50 B*/4 | — | 11.0 | 0.5 |
| 10 | 70 A/1 | 30 B/5 | — | 28.1 | 3.5 |
| 10/V[1] | 70 A/1 | 30 B*/5 | — | 15.5 | 1.0 |
| 11 | 45 A/1 | 55 B/6 | — | 13.0 | 1.7 |
| 11/V[1] | 45 A/1 | 55 B*/6 | — | 7.6 | 0.5 |
| 12 | 65 A/1 | 35 B/7 | — | 22.8 | 2.5 |
| 13 | 45 A/1 | 45 B/7 | 10 K/1 | 44.0 | 7.2 |
| 14 | 55 A/1 | 45 B/8 | — | 54.2 | 10.3 |
| 14/V[1] | 55 A/1 | 45 B*/8 | — | 20.3 | 1.5 |
| 15 | 40 A/2 | 60 B/7 | — | 24.4 | 2.7 |
| 16 | 70 A/2 | 30 B/8 | — | 84.0 | 14.1 |
| 17 | 61 A/2 | 33 B/6 | 6 K/1 | 50.2 | 6.7 |
| 17/V[1] | 61 A/2 | 33 B*/6 | 6 K/1 | 24.7 | 3.5 |
| 18 | 50 A/1 | 50 B/6 | — | 73.0 | 12.0 |
| 19 | 60 A/1 | 40 B/6 | — | 83.6 | 14.2 |

[1]Comparative Examples

EXAMPLES 20 TO 26

In these examples, components B possessing lactam groups were used.

Starting compounds employed:

Component A

A/3 Polycaorolactam having an $M_n$ of 34,000

Component B

B/9 Copolymer of
 $B_1/2$ 99% by weight of styrene and
 $B_2/3$ 1% by weight of N-methacryloyl-ε-caprolactam, prepared by continuous copolymerization with the addition of 20% by weight, based on $B_1/2+B_2/3$, of ethylbenzene at 140° C. and under 700 kPa in the course of 5 hours. A random copolymer having a weight average molecular weight of 82,000 was obtained.

B/10 Copolymer of
 $B_1/2$ 66.2% by weight of styrene,
 $B_2/3$ 0.8% by weight of N-methacryloyl-ε-caprolactam and
 $B_3/1$ 33% by weight of acrylonitrile,
prepared as for B/9; weight average molecular weight=76,000.
B/11 Copolymer of
 $B_1/2$ 74% by weight of styrene,
 $B_2/3$ 1% by weight of N-methacryloyl-ε-caprolactam and
 $B_3/1$ 25% by weight of acrylonitrile,
prepared as described under B/8 in the presence of 14% by weight, based on $B_1/2 + B_2/3 + B_3/1$, of the latex.

The following components B* were prepared for comparison:
B*/9 Polystyrene, prepared as for B/9.
B*/10 Copolymer of
 $B_1/2$ 66.7% by weight of styrene and
 $B_3/1$ 33.3% by weight of acrylonitrile,
prepared as for B/10.
B*/11 Copolymer of
 $B_1/2$ 74.8% by weight of styrene and
 $B_3/1$ 25.2% by weight of acrylonitrile,
prepared as for B/11.

The polymers were mixed in a twin-screw extruder at 270° C. in the amounts stated in Table 3.

The results of the impact strength and notched impact strength measurements are likewise shown in Table 3.

TABLE 3

| Example | Composition (% by weight) A | B | K | Impact strength DIN 53 453 kJ/m² | Izod notched impact strength ISO 180/4 A kJ/m² |
|---|---|---|---|---|---|
| 20 | 50 A/3 | 50 B/9 | — | 22.6 | 3.1 |
| 20/V¹ | 50 A/3 | 50 B*/9 | — | 13.0 | 0.7 |
| 21 | 60 A/3 | 40 B/10 | — | 27.2 | 3.0 |
| 21/V¹ | 60 A/3 | 40 B*/10 | — | 15.2 | 1.0 |
| 22 | 60 A/3 | 40 B/11 | — | 29.6 | 2.4 |
| 22/V¹ | 60 A/3 | 40 B*/11 | — | 12.6 | 1.0 |
| 23 | 48 A/3 | 40 B/9 | 12 K/1 | 47.0 | 8.3 |
| 23/V¹ | 48 A/3 | 40 B*/9 | 12 K/1 | 15.0 | 1.4 |
| 24 | 65 A/3 | 28 B/9 | 7 K/1 | 41.0 | 6.4 |
| 25 | 60 A/3 | 40 B/11 | — | 54.2 | 9.7 |
| 25/V¹ | 60 A/3 | 40 B*/11 | — | 15.6 | 1.4 |
| 26 | 57 A/3 | 38 B/11 | 5 K/1 | 76.0 | 11.1 |

¹Comparative Examples

The results in Tables 1 to 3 show that the novel molding materials possess a substantially better impact strength than molding materials without component $B_2$ which is essential to the invention.

We claim:
1. A thermoplastic molding material containing
 (A) from 5 to 95% by weight of a nylon and
 (B) from 5 to 95% by weight of a random copolymer prepared by copolymerization, composed of
 ($B_1$) from 50 to 99.9% by weight of a copolymerization styrene of the formula I

$$R^1-C=CH_2$$
$$(R^2)_m-\text{[phenyl ring]}$$

or mixtures of styrenes of the formula (I) where $R^1$ is alkyl or 1 to 4 carbon atoms or hydrogen, $R^2$ is alkyl of 1 to 6 carbon atoms or halogen and m is 0, 1, 2 or 3,
 ($B_2$) from 0.1 to 30% of a copolymerized monomer copolymerizable with a styrene of formula (I) containing a lactam group present in a moiety (VI)

$$\begin{array}{c} -C-N \\ \parallel \quad \setminus \\ O \quad R^3 \\ \quad / \\ O=C \end{array}$$

in said manner where $R^3$ is a divalent, branched or straight-chain alkylene group of 2 to 15 carbon atoms, and
 ($B_3$) from 0 to 48% by weight of further copolymerized comonomers selected from the group consisting of acrylonitrile, methacrylonitrile, alkyl acrylates and alkyl methacrylates wherein alkyl is of 1 to 12 carbon atoms, and
 (C) from 0 to 50% by weight, based on (A) and (B) of an impact-modifying rubber.

2. A thermoplastic molding material as claimed in claim 1 wherein the component B is prepared by continuous thermal copolymerization.

3. A thermoplastic molding material according to claim 1 wherein $B_2$ is copolymerized-ε-N-(meth)acrylolyl- -caprolactam.

4. Moldings produced from molding materials as claimed in claim 1 as essential components.

* * * * *